(12) United States Patent
Cao et al.

(10) Patent No.: US 12,536,738 B2
(45) Date of Patent: Jan. 27, 2026

(54) THREE-DIMENSIONAL MODEL GENERATING METHOD AND APPARATUS, AND ELECTRONIC DEVICE

(71) Applicant: CHINA RAILWAY SIYUAN SURVEY AND DESIGN GROUP CO., LTD, Wuhan (CN)

(72) Inventors: Chengdu Cao, Wuhan (CN); Qingwu Hu, Wuhan (CN); Junqi Zhang, Wuhan (CN); Liang Fei, Wuhan (CN); Wang Xia, Wuhan (CN); Hailiang Li, Wuhan (CN); Mingyao Ai, Wuhan (CN); Pengcheng Zhao, Wuhan (CN); Jiayuan Li, Wuhan (CN); Qingzhou Mao, Wuhan (CN)

(73) Assignee: CHINA RAILWAY SIYUAN SURVEY AND DESIGN GROUP CO., LTD, Wuhan (CN)

( * ) Notice: Subject to any disclaimer, the term of this patent is extended or adjusted under 35 U.S.C. 154(b) by 172 days.

(21) Appl. No.: 18/434,115

(22) Filed: Feb. 6, 2024

(65) Prior Publication Data

US 2024/0177415 A1    May 30, 2024

Related U.S. Application Data

(63) Continuation of application No. PCT/CN2022/142478, filed on Dec. 27, 2022.

(30) Foreign Application Priority Data

Oct. 20, 2022   (CN) .......................... 202211289743.6

(51) Int. Cl.
    *G06T 17/00*     (2006.01)
    *G06T 7/33*      (2017.01)
    (Continued)

(52) U.S. Cl.
    CPC .............. *G06T 17/00* (2013.01); *G06T 7/344* (2017.01); *G06T 15/04* (2013.01); *G06T 15/10* (2013.01)

(58) Field of Classification Search
    CPC ......... G06T 17/00; G06T 7/344; G06T 15/04; G06T 15/10; G06T 2219/2008; G06T 7/33; G06T 17/05; G06T 17/205; G06T 19/20
    See application file for complete search history.

(56) References Cited

U.S. PATENT DOCUMENTS

2006/0284880 A1* 12/2006 Zhou ....................... G06T 15/04
                                                                 345/582

FOREIGN PATENT DOCUMENTS

CN           105389410 A        3/2016
CN           109685080 A *      4/2019 ........... G06T 15/005
                    (Continued)

*Primary Examiner* — Haixia Du
(74) *Attorney, Agent, or Firm* — Nitin Kaushik (57) ABSTRACT

Embodiments of the present application disclose a three-dimensional model generating method and apparatus, and an electronic device. The three-dimensional model generating method includes: performing feature extraction on an aerial three-dimensional model and a ground three-dimensional model of a to-be-modeled object respectively to obtain at least three sets of feature vectors; performing registration on the aerial three-dimensional model and the ground three-dimensional model based on the feature vectors, and determining a first transition area of a fused three-dimensional model; reconstructing a triangular patch of the first transition area to obtain a second transition area; and performing texture filling on the second transition area, and determining a target three-dimensional model of the to-be-modeled object.

6 Claims, 3 Drawing Sheets

Perform feature extraction on an aerial three-dimensional model and a ground three-dimensional model of a to-be-modeled object respectively to obtain at least three sets of feature vectors — S110

Perform registration on the aerial three-dimensional model and the ground three-dimensional model based on the feature vectors, and determine a first transition area of a fused three-dimensional model — S120

Reconstruct a triangular patch of the first transition area to obtain a second transition area — S130

Perform texture filling on the second transition area, and determine a target three-dimensional — S140

(51) Int. Cl.
     *G06T 15/04*          (2011.01)
     *G06T 15/10*          (2011.01)

(56) References Cited

FOREIGN PATENT DOCUMENTS

| | | | |
|---|---|---|---|
| CN | 109690620 A | | 4/2019 |
| CN | 215298298 U | | 12/2021 |
| CN | 114332383 A | * | 4/2022 |
| CN | 115205435 A | * | 10/2022  ............ G06T 17/20 |

* cited by examiner

THREE-DIMENSIONAL MODEL GENERATING METHOD AND APPARATUS, AND ELECTRONIC DEVICE

CROSS-REFERENCE TO RELATED APPLICATIONS

The application claims priority to Chinese patent application No. 2022112897436, filed on Oct. 20, 2022, the entire contents of which are incorporated herein by reference.

TECHNICAL FIELD

The present application relates to the technical field of image and graphics processing, and in particular, to a three-dimensional model generating method and apparatus, and an electronic device.

BACKGROUND

As standardized products for new basic surveying and mapping, reality-based three-dimensional models are widely applied in many fields. At present, commonly used reality-based three-dimensional models usually include aerial three-dimensional models and ground three-dimensional models. The aerial three-dimensional models are generated by using unmanned aerial vehicle (UAV)-borne sensors oriented at different viewing angles to acquire the texture information of an object from different shooting angles such as the side and top of the object in combination with office analysis. The ground three-dimensional models are built by using various types of sensors such as multi-directional cameras to acquire the ground texture of the shot area and the side texture of an object through ground close-range photography.

However, for the aerial three-dimensional models, due to restriction by the flight altitude setting of the UAV when acquiring data, the problem of blockage by obstacles near the ground may be present in the acquisition process, resulting in that the shot ground image is incomplete, and consequently, the modeling result often has defects such as texture drawing, blurring, broken holes, geometric model distortion, and low accuracy. For the ground three-dimensional models, the top information of the ground and the object cannot be taken into consideration simultaneously, and furthermore, during large-scale city modeling, due to long data acquisition time and low efficiency, the complete reconstruction of the scenario cannot be realized alone.

SUMMARY

Embodiments of the present application are expected to provide a three-dimensional model generating method and apparatus, and an electronic device.

The technical solution of the present application is implemented as follows:

an embodiment according to a first aspect of the present application provides a three-dimensional model generating method, including:

performing feature extraction on an aerial three-dimensional model and a ground three-dimensional model of a to-be-modeled object respectively to obtain at least three sets of feature vectors;

performing registration on the aerial three-dimensional model and the ground three-dimensional model based on the feature vectors, and determining a first transition area of a fused three-dimensional model;

reconstructing a triangular patch of the first transition area to obtain a second transition area; and performing texture filling on the second transition area, and determining a target three-dimensional model of the to-be-modeled object.

Optionally, the performing registration on the aerial three-dimensional model and the ground three-dimensional model based on the feature vectors includes:

performing geometric transformation on the aerial three-dimensional model and/or the ground three-dimensional model based on the feature vectors to achieve primary registration; and performing secondary registration on the three-dimensional model subjected to the primary registration based on an iterative closest point algorithm.

Optionally, the reconstructing a triangular patch of the first transition area to obtain a second transition area includes:

reconstructing the triangular patch of the first transition area, and eliminating hole areas in the first transition area to obtain the second transition area.

Optionally, the reconstructing a triangular patch of the first transition area to obtain a second transition area includes:

screening boundary points of the first transition area by using an Alpha Shapes algorithm; and using a triangulation network growth algorithm to reconstruct the triangular patch with the screened boundary points to obtain the second transition area.

Optionally, the performing texture filling on the second transition area includes:

obtaining the texture quality of each texture image in a texture image set corresponding to each of the triangular patches in the second transition area; and distributing a target texture image for each of the triangular patches by using a Markov random field, wherein the texture quality of the target texture image is not lower than that of any texture image in the corresponding texture image set.

Optionally, the obtaining the texture quality of each texture image in a texture image set corresponding to each of the triangular patches in the second transition area includes:

obtaining a total number of pixels of each of the triangular patches in the second transition area mapped to a two-dimensional texture image and a variance of a color value included in the texture image; and determining the texture quality of each texture image based on the total number of pixels and the variance.

Optionally, after performing texture filling on the second transition area, the method further includes:

adjusting the brightness and color of the texture image of each of the triangular patches in the second transition area based on an image enhancement technology.

Optionally, after performing texture filling on the second transition area, the method further includes:

eliminating a color difference at a joint of the adjacent texture images by using a Poisson fusion algorithm.

An embodiment according to a second aspect of the present application provides a three-dimensional model generating apparatus, including:

a feature extraction module, configured to perform feature extraction on an aerial three-dimensional model and a ground three-dimensional model of a to-be-modeled object respectively to obtain at least three sets of feature vectors;

a registration module, configured to perform registration on the aerial three-dimensional model and the ground three-dimensional model based on the feature vectors, and determine a first transition area of a fused three-dimensional model;

a reconstruction module, configured to reconstruct a triangular patch of the first transition area to obtain a second transition area; and a filling module, configured to perform texture filling on the second transition area, and determine a target three-dimensional model of the to-be-modeled object.

An embodiment according to a third aspect of the present application provides an electronic device, including a memory and a processor, wherein the memory stores a computer program, and when the computer program is executed by the processor, the processor performs the steps of the method according to the first aspect.

According to the three-dimensional model generating method and apparatus, and the electronic device provided by the embodiments of the present application, the three-dimensional model generating method includes: performing feature extraction on an aerial three-dimensional model and a ground three-dimensional model of a to-be-modeled object respectively to obtain at least three sets of feature vectors; performing registration on the aerial three-dimensional model and the ground three-dimensional model based on the feature vectors, and determining a first transition area of a fused three-dimensional model; reconstructing a triangular patch of the first transition area to obtain a second transition area; and performing texture filling on the second transition area, and determining a target three-dimensional model of the to-be-modeled object. According to the technical solution of the present application, the aerial three-dimensional model and the ground three-dimensional model are fused, a transition area of the two three-dimensional models is reconstructed, and texture mapping is performed, so that a complete architecture of the three-dimensional model of the target area is achieved, the image quality of the fused three-dimensional model is ensured, and the refinement degree of the reality-based three-dimensional model of the target area is improved.

DETAILED DESCRIPTION OF THE EMBODIMENTS

The technical solution in the embodiments of the present application will be clearly and completely described below with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

In addition, the drawings are only schematic illustrations of the present application and are not necessarily drawn to scale. In the drawings, the same reference numeral denotes the same or similar parts, and thus their repeated description will be omitted. Some block diagrams shown in the drawings are functional entities and do not necessarily correspond to a physically or logically independent entity. These functional entities may be implemented in the form of software, or these functional entities may be implemented in one or more hardware modules or integrated circuits, or these functional entities may be implemented in different networks and/or processor apparatuses and/or micro-controller apparatuses.

The flowchart shown in the drawings is for illustration only and does not necessarily include all steps. For example, some steps may be decomposed, while some steps may be combined or partially combined; therefore, the actual implementation sequence may change according to the actual situation.

The terms used herein are only intended to describe the embodiments rather than limit the present application. When used herein, the singular forms "a", "an" and "the" are also intended to include the plural forms, unless the context clearly indicates otherwise. It should also be understood that the terms "comprise" and/or "include", when used in the specification, are used to determine the presence of the feature, integer, step, operation, element, and/or part, but do not exclude the presence or addition of more other features, integers, steps, operations, elements, parts and/or groups. When used herein, the term "and/or" includes any and all combinations of related listed items.

Figure 1:
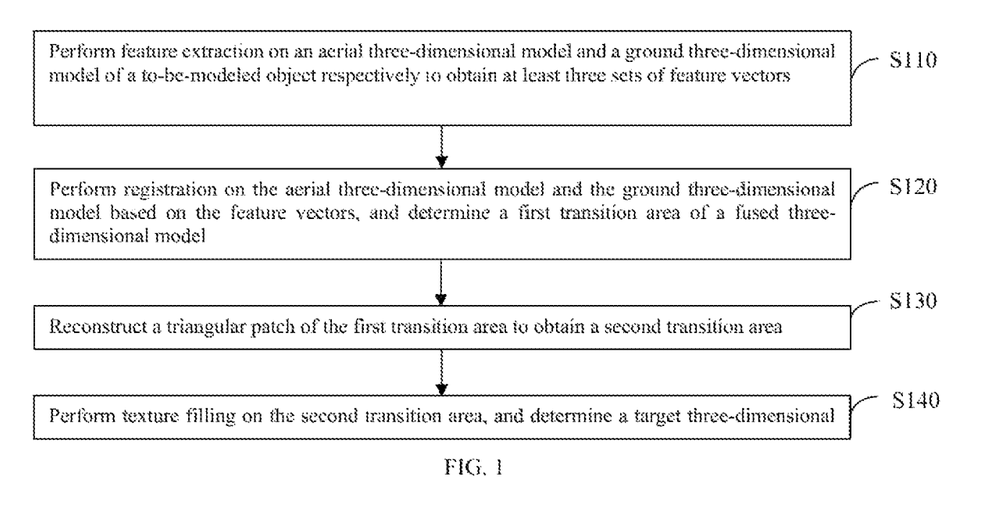
FIG. 1 is a schematic flowchart of a three-dimensional model generating method according to an embodiment of the present application.

In some embodiments, referring to FIG. 1, FIG. 1 is a schematic flowchart of a three-dimensional model generating method according to an embodiment of the present application. The three-dimensional model generating method includes the following steps:

Step S110: perform feature extraction on an aerial three-dimensional model and a ground three-dimensional model of a to-be-modeled object respectively to obtain at least three sets of feature vectors.

In this embodiment, based on the oblique photogrammetry technology, the aerial three-dimensional model is generated by using unmanned aerial vehicle (UAV)-borne sensors oriented at different viewing angles to acquire the texture information of the to-be-modeled object from different shooting angles such as the side and top of the object in combination with office analysis. Accordingly, the ground three-dimensional model is built by using mobile ground apparatus-borne cameras to acquire the ground texture of the shot area and the side texture of the object through ground close-range photography.

In an optional embodiment, performing feature extraction on an aerial three-dimensional model of a to-be-modeled object includes: establishing a structure list based on the feature vectors so as to determine a hole boundary of the aerial three-dimensional model based on the structure list.

Here, the structure list may include a point list, an edge list, and a face list, wherein the face list includes the serial number of a triangular patch and the serial number of a vertex corresponding to the triangular patch; the point list includes the coordinates (x, y, z) of each vertex of the triangular patch; and the edge list includes the serial number of an edge and the serial numbers of corresponding points of the edge, and the number of the adjacent triangular patches is set to 1 when the edge is read for the first time. According to the structure list, the edge with the number of the adjacent triangular patches being 1 may be found, and a boundary edge is output, so that the model boundary and the hole boundary can be distinguished according to the length of the boundary edge, the longest boundary edge is determined as the model boundary, and the other boundary edges are determined as hole boundaries.

Step S120: perform registration on the aerial three-dimensional model and the ground three-dimensional model based on the feature vectors, and determine a first transition area of a fused three-dimensional model.

In this embodiment, the aerial three-dimensional model can be mapped to the ground three-dimensional model through spatial transformation, and the feature vectors in the aerial three-dimensional model are in one-to-one correspondence with the feature vectors in the ground three-dimensional model, so that the aerial three-dimensional model and the ground three-dimensional model are fused.

In this embodiment, based on three feature vectors in the aerial three-dimensional model and the corresponding three feature vectors in the ground three-dimensional model, the aerial three-dimensional model and the ground three-dimensional model are registered to determine the first transition area of the fused three-dimensional model. It should be noted that the number of feature vectors for registration may be not limited to three, or may be four or five, which is not limited herein.

In some embodiments, performing registration on the aerial three-dimensional model and the ground three-dimensional model based on the feature vectors includes:
  performing geometric transformation on the aerial three-dimensional model and/or the ground three-dimensional model based on the feature vectors to achieve primary registration; and
  performing secondary registration on the three-dimensional model subjected to the primary registration based on an iterative closest point algorithm.

In this embodiment, the reality-based aerial and ground three-dimensional
  models are unified into the same coordinate system by using a conversion formula;
  wherein the conversion formula is:

$$\begin{bmatrix} X \\ Y \\ Z \end{bmatrix} = \begin{bmatrix} \Delta X \\ \Delta Y \\ \Delta Z \end{bmatrix} + R \begin{bmatrix} Sx \\ Sy \\ Sz \end{bmatrix};$$

wherein x, y, and z are the coordinates of the reality-based ground three-dimensional model before registration, X, Y, and Z are the coordinates of the reality-based ground three-dimensional model after registration, $\Delta X$, $\Delta Y$, and $\Delta Z$ are translation parameters, $$R = \begin{bmatrix} a_1 & a_2 & a_3 \\ b_1 & b_2 & b_3 \\ c_1 & c_2 & c_3 \end{bmatrix}$$

is a rotation matrix, and S is a scaling factor (that is, a scale factor) before and after registration.

At least one of the aerial three-dimensional model and the ground three-dimensional model is subjected to translation, scaling, and other operations, so that the aerial three-dimensional model and the ground three-dimensional model are subjected to primary registration, and the three-dimensional models subjected to primary registration are processed based on an iterative closest point algorithm. Some point sets with obvious features are selected for registration, thereby greatly reducing the number of the corresponding points and effectively reducing the fusion cost of the three-dimensional models.

Step S130: reconstruct a triangular patch of the first transition area to obtain a second transition area.

A hole area is usually present in the first transition area of the three-dimensional model obtained through the primary fusion of the aerial three-dimensional model and the ground three-dimensional model and can be embodied in the hole boundary of the structure list. The hole area will greatly affect the image quality of the three-dimensional model, so it is necessary to process the hole area to eliminate the influence of the hole area on the three-dimensional model.

In some embodiments, reconstructing a triangular patch of the first transition area to obtain a second transition area includes:
  reconstructing the triangular patch of the first transition area and eliminating a hole area in the first transition to obtain the second transition area.

In a patch of a polygonal mesh, the triangular patch is the segmented smallest unit which is represented simply and flexibly and convenient for topological description, thus being widely used. The triangular patch may include three vertexes in a world coordinate system, and a surface of the three-dimensional model of a to-be-modeled object is formed by a large number of triangular patches. The triangular patch is reconstructed, so that the hole area in the first transition area can be eliminated, and the image quality of the fused three-dimensional model can be improved.

In some embodiments, reconstructing a triangular patch of the first transition area to obtain a second transition area includes:
  screening boundary points of the first transition area by using an Alpha Shapes algorithm; and
  using a triangulation network growth algorithm to reconstruct the triangular patch with the screened boundary points to obtain the second transition area.

In this embodiment, the boundary of the first transition area is detected, a boundary edge is output by establishing a data structure list, and an average value of an average distance between internal and external boundary points is taken as a re-sampling interval for vertex re-sampling. Primary network construction is performed by using an Alpha Shapes algorithm to screen the vertexes of the triangular patch, and then a Delaunay triangulation network growth algorithm is used to reconstruct the triangular patch with the screened boundary points. A next convex hull edge adjacent to the boundary edge is searched by starting from the boundary edge of the first transition area and expanding outwards, the boundary edge searched in the previous step is deleted, only the vertexes are retained, and a convex closure with constraints is used to complete network reconstruction based on a Delaunay triangulation network growth algorithm until the constructed triangulation network has no hole and the network construction principle of the boundary edge is consistent with that of the boundary edge of the original model. Here, the original model is an aerial three-dimensional model or a ground three-dimensional model. When the triangulation network area is closer to the aerial three-dimensional model, the original model is the aerial three-dimensional model; and when the triangulation network area is closer to the ground three-dimensional model, the original model is the ground three-dimensional model.

The specific principle of the Delaunay triangulation network growth algorithm for the convex closure based on the constrained boundary is as follows: search boundary points of the convex closure from the constrained boundary, connect the boundary points end to end to form the convex closure, and then take any point of the boundary of the convex closure as a starting point and one boundary where the starting point is located as a boundary edge to construct a Delaunay triangulation with one edge of the first constructed triangulation as a boundary edge; next, repeat the above steps to construct a next Delaunay triangulation until a certain vertex of the constructed Delaunay triangulation forms a second boundary point of the convex closure, which indicates that a first layer of Delaunay triangulations is completely constructed, and then take an outer edge of the first layer of Delaunay triangulations as a new boundary edge, and repeat the above steps until all points of the convex closure in the constrained boundary are constructed into a triangulation.

Step S140: perform texture filling on the second transition area, and determine a target three-dimensional model of the to-be-modeled object.

In this embodiment, a plurality of texture images are obtained according to an area of each triangular patch mapped to a two-dimensional image and an energy function is iteratively optimized so that a mapping relationship corresponding to the minimum value of the energy function can be determined as a mapping relationship between the triangular patch and the texture images. It should be noted that the energy function may be a Markov random field (MFP) energy function. At least one triangular patch corresponding to the two-dimensional image is determined according to surface information of the to-be-modeled object shot when an image acquisition apparatus acquires images, and then a texture image set on the two-dimensional image is determined through the reverse mapping of three vertexes of each triangular patch on the three-dimensional model to the corresponding two-dimensional image. For example, a first surface of the to-be-modeled object is shot when the image acquisition apparatus acquires a certain two-dimensional image, and then at least one texture image is determined with reference to an area of at least one triangular patch corresponding to the first surface of the three-dimensional model reversely mapped to the two-dimensional image, and each triangular patch correspondingly determines one texture image.

In some embodiments, performing texture filling on the second transition area includes:

obtaining the texture quality of each texture image in a texture image set corresponding to each of the triangular patches in the second transition area; and distributing a target texture image for each of the triangular patches by using a Markov random field, wherein the texture quality of the target texture image is not lower than that of any texture image in the corresponding texture image set.

In this embodiment, the target texture image is a texture image with the highest texture quality in the texture image set. When two or more texture images with equivalent texture quality are present, one of them can be selected as the target texture image. The mapping relationship between the triangular patch and the texture image is changed each time so that the energy value of the energy function can finally reach the minimum value. When the energy value reaches the minimum value, optimization ends and the corresponding mapping relationship between the triangular patch and the texture image at that time can serve as the mapping relationship of texture filling, thereby ensuring the effect of the target three-dimensional model.

The specific principle of distributing the target texture image for each of the triangular patches by using a Markov random field is as follows:

calculate the quality Q of each image:

$$Q = -\int_{\phi(F_i, I_i)}^{1} \|\nabla (I_i(p))\|_2 dp;$$

wherein $\phi(F_i, I_i)$ is an area of the triangular patch projected to the two-dimensional image;

the Markov random field energy formula is:

$$E(l) = \Sigma_{F_i}^{efaces} E_{data}(F_i, I_i) + \Sigma_{F_i, F_j \in Edges} E_{smooth}(F_i, F_j, I_i, I_j)$$

wherein the triangular patch $I = \{I_1, I_2, \ldots, I_n\}$ (k is the number of triangular patches), the calibrated two-dimensional image $F = \{F_1, F_2, \ldots, F_k\}$ (n is the format of the selected image), an optimal mark is selected for any triangular patch $F_i (i=1,2,\ldots,k)$ to mark the sequence $L = \{l_1, \ldots l_k\}$, the mark is an integer between 1 and n and represents an image index number, the data term $E_{data}$ is the image texture quality of the triangular patch $F_i$, and the smoothing term $E_{smooth}$ is the consistency of the texture at the joint of the adjacent triangular patches $F_i$ and $F_j$.

In some embodiments, obtaining the texture quality of each texture image in a texture image set corresponding to each of the triangular patches in the second transition area includes:

obtaining a total number of pixels of each of the triangular patches in the second transition area mapped to a two-dimensional texture image and a variance of a color value included in the texture image; and determining the texture quality of each texture image based on the total number of pixels and the variance.

In this embodiment, the data term $E_{data}$ may be measured from the information richness and clarity of the texture image corresponding to the triangular patch. Specifically, the information richness of the texture image can be measured by the total number of pixels of the triangular patch mapped to the two-dimensional texture image, and the clarity can be measured by the variance of the color value included in the texture image. As such, $$E_{data}(F_i, I_i) = -\pi_{l_i}(F_i)D(X)$$

wherein $\pi I_i$ represents the total number of pixels of the triangular patch $F_i$ projected to the texture image $I_i$, D(X) represents the variance of the color value included in an area D (a randomly sampled 3*3 pixel area). The greater the variance, the clearer the image, and conversely, the smaller the variance, the more blurred the image.

In the formula, $$D(X) = \sum_{k=1}^{9} (x_k - \mu)^2;$$

wherein $\chi_k$ is the color of the k pixel, and $\mu$ is the average value of the colors in the area D;

$E_{data}$ is the product of the above two functions and can serve as a standard to measure the texture image and a reference standard to select the optimal texture image.

The smoothing term $E_{smooth}$ is used to solve the texture misalignment phenomenon generated when different images are selected for the adjacent triangular patches. A Potts model is generally used as the smoothing term. The Potts model is:

$$E_{smooth} = [l_i \neq l_j];$$

wherein [•] represents Iverson brackets, the value is 1 when the expression in the brackets is valid, and the value is 0 when the expression in the brackets is invalid. That is, $E_{smooth}$ is 0 when the same texture image is selected for the two patches $F_i$ and $F_j$, and $E_{smooth}$ is 1 when different texture images are selected for the two patches.

It can be deduced through this model that texture gaps will be reduced when the same texture image is selected for the adjacent patches. For the texture between the adjacent patches for which different texture images are selected, the formula below may be used:

$$E = \int_{I_i}^1 \|I_i(p) - I_j(p)\|^2 dp;$$

E is used to describe the texture continuity corresponding to the two adjacent triangular patches, the smaller the value, the smaller the difference between the textures, and the higher the texture quality after final mapping.

According to the embodiments of the present application, the aerial three-dimensional model and the ground three-dimensional model are fused, a transition area of the two three-dimensional models is reconstructed, and texture mapping is performed, so that a complete architecture of the three-dimensional model of the target area is achieved, the image quality of the fused three-dimensional model is ensured, and the refinement degree of the reality-based three-dimensional model of the target area is improved.

In some embodiments, after performing texture filling on the second transition area, the method further includes:

adjusting the brightness and color of the texture image of each of the triangular patches in the second transition area based on an image enhancement technology.

The image enhancement technology takes use of a Laplacian operator, and the Laplacian sharpening formula is:

$$\nabla F(x, y) = \frac{\partial^2 F(x, y)}{\partial x^2} + \frac{\partial^2 F(x, y)}{\partial y^2};$$

wherein the former term is a differential coefficient in an x direction, the latter term is a differential coefficient in a y direction, and x and y are the row and column numbers of a pixel;

in this embodiment, the overall color adjustment based on a color gradient is required to be constrained from two aspects: i.e., ensure that the color values of the adjusted color on the left and right sides of the joint are similar to each other to the greatest extent and that the color pixel value gradient of the adjacent points located at the boundary after color adjustment is consistent with the original image before adjustment.

Here, in order to ensure that the color values of the adjusted color on the left and right sides of the joint are similar to each other to the greatest extent:

$$\mathrm{argmin}_g \Sigma_v (f_{vleft} + g_{vleft} - (f_{vright} + g_{vright}))^2;$$

wherein $g_v$ represents a value of a pixel point v required to be adjusted, $v_i$ and $v_j$ respectively represent the adjacent pixel points in the same texture block, $(f_{vleft} + g_{vleft})$ represents the color value of the adjusted color on the left side of the joint, and $(f_{vright} + g_{vright})$ represents the color value of the adjusted color on the right side of the joint.

In order to ensure that the color pixel value gradient of the adjacent points located at the boundary after color adjustment is consistent with the original image before adjustment:

$$\mathrm{argmin}_g \Sigma_{u \in N(v)}((f_v + g_v - (f_u + g_u)) - (f_v - f_u))^2;$$

wherein $((f_v + g_v - (f_u + g_u))$ represents the pixel value color gradient of the adjacent two points after color adjustment, $(f_v - f_u)$ represents the color gradient of the original image, and N(v) represents the set of two neighboring pixels of the pixel point v on the boundary.

In some embodiments, after performing texture filling on the second transition area, the method further includes:

eliminating a color difference at a joint of the adjacent texture images by using a Poisson fusion algorithm.

The Poisson fusion algorithm is required to meet the following condition:

$$\mathrm{Div}_{source} = \mathrm{Div}_{target};$$

wherein $\mathrm{Div}_{source}$ is the divergence of the original image, and $\mathrm{Div}_{target}$ is the divergence of the fused image. To ensure that the area divergences before and after Poisson fusion are consistent, the divergence formula is as follows:

$$\mathrm{Div}_{(x,y)} = \mathrm{color}_{(x-1,y)} - \mathrm{color}_{(x,y-1)} + \mathrm{color}_{(x,y+1)} + \mathrm{color}_{(x+1,y)} - 4\mathrm{clor}_{(x,y)};$$

wherein the left side of the formula represents the divergence of the current pixel point, the four terms on the right side of the formula represent the colors of the front, rear, left, and right pixels of the current pixel point, the last term on the right side represents the color of the current pixel point, and x and y represent the row and column numbers corresponding to the current pixel.

The brightness and color of the texture image of the second transition area after fusion are adjusted, so that the transition of the fused area of the aerial three-dimensional model and the ground three-dimensional mode is more natural, the image quality of the fused three-dimensional model is ensured, and the refinement degree of the real three-dimensional model in the target area is improved.

Figure 2:
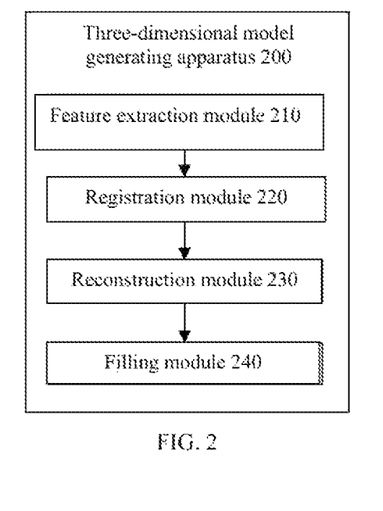
FIG. 2 is a schematic structural diagram of a three-dimensional model generating apparatus according to an embodiment of the present application.

In some embodiments, referring to FIG. 2, FIG. 2 is a schematic structural diagram of a three-dimensional model generating apparatus according to an embodiment of the present application. The embodiment of the present application provides a three-dimensional model generating apparatus 200, including:

a feature extraction module 210, configured to perform feature extraction on an aerial three-dimensional model and a ground three-dimensional model of a to-be-modeled object respectively to obtain at least three sets of feature vectors;

a registration module 220, configured to perform registration on the aerial three-dimensional model and the ground three-dimensional model based on the feature vectors, and determine a first transition area of a fused three-dimensional model;

a reconstruction module 230, configured to reconstruct a triangular patch of the first transition area to obtain a second transition area; and a filling module 240, configured to perform texture filling on the second transition area, and determine a target three-dimensional model of the to-be-modeled object.

In some embodiments, the registration module 220 is specifically configured to:

perform geometric transformation on the aerial three-dimensional model and/or the ground three-dimensional model based on the feature vectors to achieve primary registration; and perform secondary registration on the three-dimensional model subjected to the primary registration based on an iterative closest point algorithm.

In some embodiments, the reconstruction module 230 is specifically configured to:

reconstruct the triangular patch of the first transition area and eliminate a hole area in the first transition to obtain the second transition area.

In some embodiments, the reconstruction module 230 is further specifically configured to:

screen boundary points of the first transition area by using an Alpha Shapes algorithm; and use a triangulation network growth algorithm to reconstruct the triangular patch with the screened boundary points to obtain the second transition area.

In some embodiments, the filling module 240 is specifically configured to:

obtain the texture quality of each texture image in a texture image set corresponding to each of the triangular patches in the second transition area; and distribute a target texture image for each of the triangular patches by using a Markov random field, wherein the texture quality of the target texture image is not lower than that of any texture image in the corresponding texture image set.

In some embodiments, the filling module 240 is further specifically configured to:

obtain a total number of pixels of each of the triangular patches in the second transition area mapped to a two-dimensional texture image and a variance of a color value included in the texture image; and determine the texture quality of each texture image based on the total number of pixels and the variance.

In some embodiments, the three-dimensional model generating apparatus 200 further includes an adjusting module. The adjusting module is configured to:

adjust the brightness and color of the texture image of each of the triangular patches in the second transition area based on an image enhancement technology.

In some embodiments, the three-dimensional model generating apparatus 200 further includes an eliminating module. The eliminating module is configured to:

eliminate a color difference at a joint of the adjacent texture images by using a Poisson fusion algorithm.

It should be noted that the description of the three-dimensional model generating apparatus embodiment is similar to that of the three-dimensional model generating method embodiment, and the three-dimensional model generating apparatus embodiment has beneficial effects similar to those of the three-dimensional model generating method embodiment. Reference may be given to the description of the three-dimensional model generating method embodiment of the present application for the technical details undisclosed in the three-dimensional model generating apparatus embodiment of the present application, which will not be elaborated herein.

Figure 3:
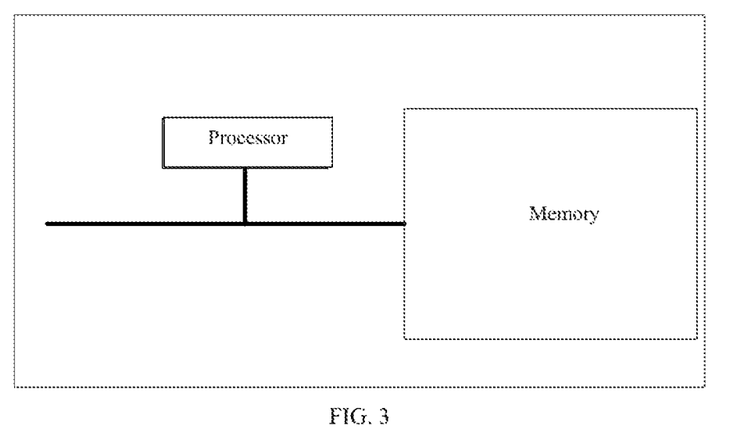
FIG. 3 is a schematic structural diagram of an electronic device according to an embodiment of the present application.

In some embodiments of the present application, an electronic device is provided. Referring to FIG. 3, FIG. 3 is a schematic structural diagram of an electronic device according to an embodiment of the present application. The electronic device includes a memory and a processor, wherein the memory stores a computer program, and when the computer program is executed by the processor, the processor performs the steps of the above-mentioned three-dimensional model generating method.

The electronic device may be a terminal, a server, or a similar arithmetic apparatus. The electronic device may be quite different due to different configurations or performances and may include one or more central processing units (CPUs), including but not limited to a microprocessor unit such as an MCU or a programmable logic device such as an FPGA, a memory for storing data, and one or more storage media (for example, one or more mass storage devices) for storing application programs or data. The memory and the storage medium may be used for transient storage or persistent storage. The program stored in the storage medium may include one or more modules and each of the modules may include a series of instruction operations on the electronic device. Further, the central processing unit may be configured to communicate with the storage medium to perform the series of instruction operations stored therein on the electronic device. The electronic device may further include one or more power supplies, one or more wired or wireless network interfaces, one or more input/output interfaces, and/or one or more operating systems, such as Windows Server, Mac OS X, Unix, Linux, and FreeBSD. The input/output interface may be configured to receive or transmit data via one network.

Specific examples of the above-mentioned network may include a wireless network provided by a communication provider of the electronic device.

In one example, the input/output interface includes a network interface controller (NIC) which may be connected to another network device through a base station so as to communicate with the Internet. In one exemplary embodiment, the input/output interface may be a radio frequency (RF) module configured to communicate with the Internet in a wireless manner.

Those of ordinary skill in the art may understand that the structure shown in FIG. 3 is only illustrative and does not limit the structure of the above-mentioned electronic device. For example, the electronic device may further include more or less components than those shown in FIG. 3 or have a configuration different from that shown in FIG. 3.

In some embodiments of the present application, a computer-readable storage medium is provided. A computer program is stored in the computer-readable storage medium, and when the computer program is executed by a processor, the steps of the above-mentioned three-dimensional model generating method are implemented.

It should be noted that the descriptions of the electronic device embodiment and the storage medium embodiment are similar to the description of the three-dimensional model generating method embodiment, and the electronic device embodiment and the storage medium embodiment have beneficial effects similar to those of the three-dimensional model generating method embodiment. Reference may be given to the description of the three-dimensional model generating method embodiment of the present application for the technical details undisclosed in the electronic device embodiment and the storage medium embodiment of the present application, which will not be elaborated herein.

In the several embodiments provided by the present application, it should be understood that the disclosed three-dimensional model generating method and apparatus, device, and storage medium may be implemented in other manners. The method, apparatus, device, and storage medium embodiments described above are only illustrative.

The three-dimensional model generating method and apparatus, the electronic device, and the storage medium recorded in the embodiments of the present application only take the embodiments of the present application as an example but are not limited thereto, and as long as the generating method and apparatus, the electronic device, and the storage medium are involved, they shall fall within the protection scope of the present application.

It should be understood that "one embodiment" or "an embodiment" mentioned in the specification means that the specific features, structures, and characteristics related to the embodiment are included in at least one embodiment of the present application. Therefore, "in one embodiment" or "in an embodiment" appearing in various places of the specification does not necessarily refer to the same embodiment. In addition, these specific features, structures, or characteristics may be combined in one or more embodiments in any suitable manner. It should be understood that the serial number of each step of various embodiments of the present application does not indicate the execution sequence which should be determined by the function and internal logic of the step, and shall not limit the implementation of the embodiments of the present application. The serial numbers of the foregoing embodiments of the present application are merely for description and do not imply the preference among the embodiments.

It should be noted that the terms "comprise", "include" or any other variants thereof used herein are intended to encompass non-exclusive inclusion so that a process, method, article, or apparatus that includes a series of elements not only includes these elements but also may further include other elements not expressly listed, or elements inherent to such process, method, article, or apparatus. Unless more limitations are stated, an element defined by the phrase "including a . . . " does not exclude the presence of additional identical elements in the process, method, article, or apparatus that includes the element.

The above merely describes the embodiments of the present application and the protection scope of the present application is not limited thereto. Any person familiar with the technical field can easily conceive modifications or replacements within the technical scope of the present application, and such modifications or replacements shall fall within the protection scope of the present application. Therefore, the protection scope of the present application shall be subject to the protection scope of the claims.

What is claimed is:

1. A three-dimensional model generating method, comprising:
based on an oblique photogrammetry technology, acquiring texture information using unmanned aerial vehicle borne sensors and mobile ground apparatus-borne cameras, to build an aerial three-dimensional model and a ground three-dimensional model;
performing feature extraction on the aerial three-dimensional model and the ground three-dimensional model of a to-be-modeled object respectively to obtain at least three sets of feature vectors;
performing registration on the aerial three-dimensional model and the ground three-dimensional model based on the feature vectors to obtain a fused three-dimensional model, and determining a first transition area of the fused three-dimensional model;
reconstructing triangular patches of the first transition area to obtain a second transition area; and
performing texture filling on the second transition area to obtain a three-dimensional model of the to-be-modeled object;
wherein the performing registration on the aerial three-dimensional model and the ground three-dimensional model based on the feature vectors to obtain a fused three-dimensional model comprises:
performing geometric transformation on the aerial three-dimensional model and/or the ground three-dimensional model based on the feature vectors to achieve primary registration and obtain a three-dimensional model subjected to the primary registration; and
performing secondary registration on the three-dimensional model subjected to the primary registration based on an iterative closest point algorithm,
the reconstructing triangular patches of the first transition area to obtain a second transition area comprises:
screening boundary points of the first transition area by using an Alpha Shapes algorithm; and
using a triangulation network growth algorithm to reconstruct the triangular patches with the screened boundary points, until hole areas in the reconstructed triangular patches are eliminated and a network construction principle of the boundary edge of the reconstructed triangular patches is consistent with that of an original model, to obtain the second transition area, wherein the original model is the aerial three-dimensional model or the ground three-dimensional model.

2. The three-dimensional model generating method according to claim 1, wherein
the performing texture filling on the second transition area comprises:
obtaining a texture quality of each texture image in a texture image set corresponding to each of the triangular patches in the second transition area; and
distributing a target texture image for each of the triangular patches by using a Markov random field, wherein the texture quality of the target texture image is not lower than that of any texture image in the corresponding texture image set.

3. The three-dimensional model generating method according to claim 2, wherein
the obtaining the texture quality of each texture image in a texture image set corresponding to each of the triangular patches in the second transition area comprises:
obtaining a total number of pixels of each of the triangular patches in the second transition area mapped to a two-dimensional texture image and a variance of a color value included in the texture image; and
determining the texture quality of each texture image based on the total number of pixels and the variance.

4. The three-dimensional model generating method according to claim 1, wherein
after performing texture filling on the second transition area, the method further comprises:
adjusting a brightness and a color of the texture image of each of the triangular patches in the second transition area based on an image enhancement technology.

5. The three-dimensional model generating method according to claim 1, wherein
after performing texture filling on the second transition area, the method further comprises:
eliminating a color difference at a joint of adjacent texture images by using a Poisson fusion algorithm.

6. An electronic device, comprising
a memory and a processor, wherein the memory stores a computer program; and when the computer program is executed by the processor, the processor performs the steps of the method according to claim 1.

* * * * *